United States Patent
Peng et al.

(10) Patent No.: US 8,013,479 B2
(45) Date of Patent: Sep. 6, 2011

(54) HIGH POWER-DENSITY POWER GENERATING MODULE

(75) Inventors: Wen-Yang Peng, Hsinchu County (TW); Lai-Sheng Chen, Hsinchu (TW); Jui-Hung Liu, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 154 days.

(21) Appl. No.: 12/477,657

(22) Filed: Jun. 3, 2009

(65) Prior Publication Data
US 2010/0156199 A1    Jun. 24, 2010

(30) Foreign Application Priority Data
Dec. 22, 2008    (TW) ................................ 97149995 A

(51) Int. Cl.
*H02K 41/02* (2006.01)
(52) U.S. Cl. .................................................. 310/12.12
(58) Field of Classification Search .... 310/12.01–12.33, 310/179
See application file for complete search history.

(56) References Cited

U.S. PATENT DOCUMENTS

| | | | | |
|---|---|---|---|---|
| 4,641,065 A * | 2/1987 | Shibuki et al. | ................ | 318/135 |
| 5,203,432 A * | 4/1993 | Grinaski | ................ | 187/251 |
| 5,744,879 A * | 4/1998 | Stoiber | ................ | 310/12.21 |
| 5,808,381 A * | 9/1998 | Aoyama et al. | ............ | 310/12.29 |
| 6,768,230 B2 * | 7/2004 | Cheung et al. | ................ | 310/30 |
| 7,089,043 B2 | 8/2006 | Tu et al. | | |
| 7,309,934 B2 * | 12/2007 | Tu et al. | ................ | 310/12.12 |
| 2005/0206247 A1 | 9/2005 | Stewart et al. | | |
| 2008/0024014 A1 | 1/2008 | Kang et al. | | |
| 2008/0074083 A1 * | 3/2008 | Yarger et al. | ................ | 320/137 |

FOREIGN PATENT DOCUMENTS
EP        1732197 A2    12/2006

OTHER PUBLICATIONS

The German Patent and Trade Mark Office, "Office Action", May 26, 2011, Germany.

* cited by examiner

*Primary Examiner* — Nguyen N Hanh
(74) *Attorney, Agent, or Firm* — Morris Manning Martin LLP; Tim Tingkang Xia, Esq.

(57) ABSTRACT

A high power-density power generating module, comprising: a magnet unit having a plurality of adjacent magnets with opposite magnet-pole arrangement against adjacent ones, each with a magnetic north pole and a magnetic south pole; and a winding unit having a plurality of adjacent windings around the adjacent magnets; wherein the magnet unit is capable of moving relatively to the winding unit and the angle between the linking direction of the magnetic north pole and the magnetic south pole of each magnet and the winding surface of each winding is larger than 0 degree and smaller than 90 degrees.

12 Claims, 14 Drawing Sheets

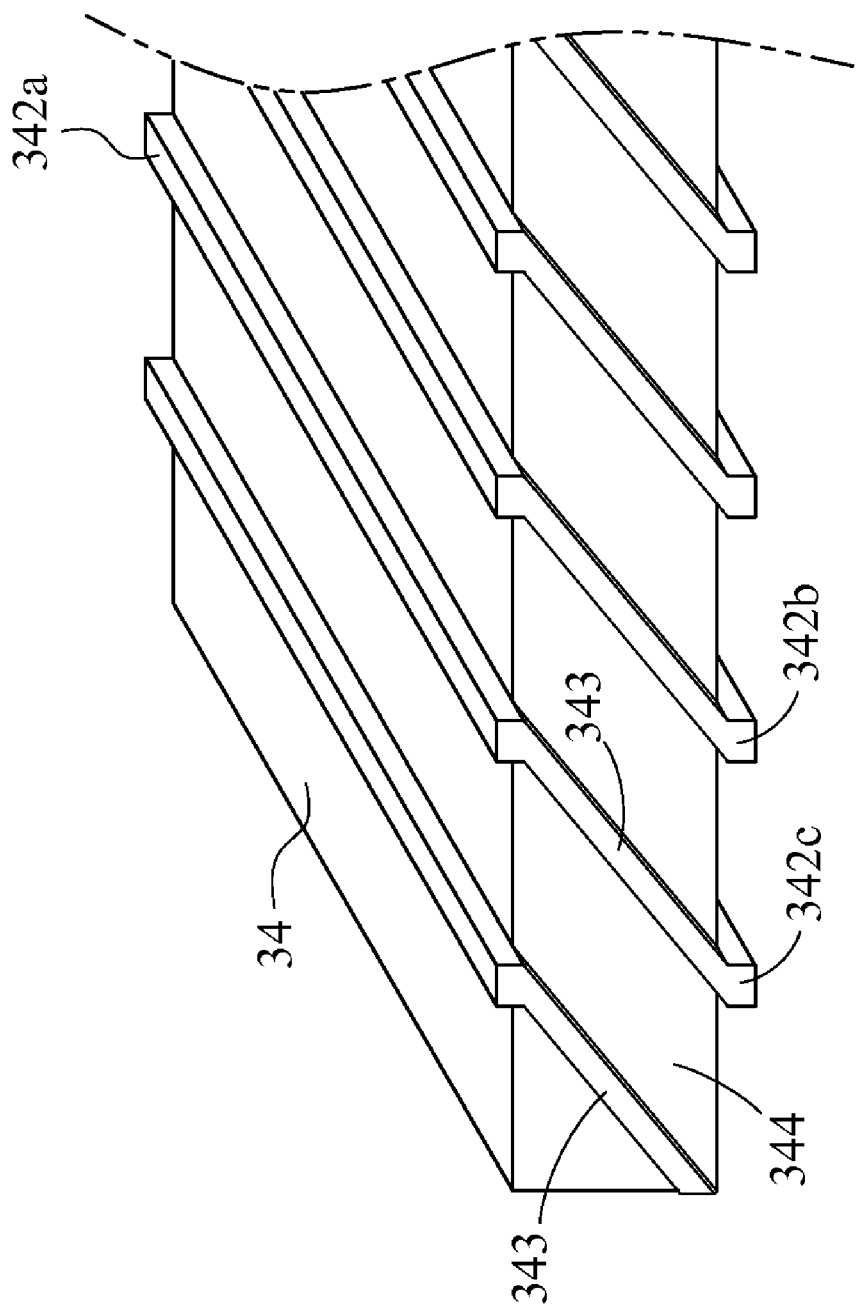

HIGH POWER-DENSITY POWER GENERATING MODULE

FIELD OF THE INVENTION

The present invention generally relates to a permanent magnet structure for an electric machine or a power generator and, more particularly, to a low speed or low frequency high power-density power generating module.

BACKGROUND OF THE INVENTION

The power generator has been widely used by the people doing all walks of life. With the battery-free trend being accepted, the design of compact high efficiency power generator has become an important field of interest. Compact power generating devices can be used as a power supply for portable electronic products. Therefore, generating sufficient power with reasonable cost in limited space has become a key issue to make these compact portable power generating devices widely adopted. These compact power generating devices can be installed in/on wearable portions such as the pockets, the shoes, the glasses and the watch for emergent power requirements by, such as, illumination, radio and communication devices. The reciprocating handpower flash light has been developed with low power efficiency. The magnetic power generators can be divided into continuous rotary, oscillating, and reciprocating power generators according to the movement of the active cells. Some reciprocating power generators are designed to be flat due to the spatial limitation. However, to provide sufficient power, the currently used pipe reciprocating linear power generators are spatially efficientless because they are not flat.

Taking permanent magnet power generators or excited power generators for example, if the active cell is disposed inside the winding and is a multi-pole magnetized magnet or is multi-pole magnetic flux distributed by claw-pole magnetic conductance, the winding axis of each of the windings is generally parallel with the direction of the magnetic pole, which results in gaps between the wings to reduce the winding density and shorten the effective winding length. The gaps are generally filled with silicon steel core, causing the cogging force. The power density of a power generator is related to the number of windings in the effective magnetic region. For low speed magnetic power generator with limited speed or displaced stroke, it is important to increase the power density of the power generator at a low speed.

For a reciprocating linear power generator as shown in FIG. 1, the stroke of the active cell 10 is required to be twice the length of the winding 12 so that the winding 12 corresponds to the maximum induced output voltage. Furthermore, the intensity variation of magnetic flux along each turn of the winding 12 is large, it is possible that the efficiency of power conversion between electricity and kinetic energy can be further improved under the same input energy.

For a symmetric linear motor/power generator (as shown in FIG. 2A, FIG. 2B and FIG. 2C, wherein FIG. 2A is a side view, FIG. 2B is a top view, and FIG. 2C is an enlarged view of the winding), the winding 22 is disposed in the center of the magnet. Inspecting the effective length of each turn of the winding 22 from the viewpoint of magnetic flux as shown in FIG. 2C, the effective induced electromotive force is generated on the L2 portion, while the L1 portion in parallel with the magnetic flux is neglected. Therefore, compared to the winding around the magnet, the symmetric linear motor/power generator has poor magnetic force to length ratio, and lengthened conductive wires lead to increased cost and higher internal resistance.

SUMMARY OF THE INVENTION

The present invention provides a high power-density power generating module, comprising: a magnet unit having a plurality of adjacent magnets with opposite magnet-pole arrangement against adjacent ones, each with a magnetic north pole and a magnetic south pole; and a winding unit having a plurality of adjacent windings with opposite winding directions around the magnet unit; wherein the magnet unit is capable of moving relatively to the winding unit and the angle between the linking direction of the magnetic north pole and the magnetic south pole of each magnet and the winding surface of each winding is larger than 0 degree and smaller than 90 degrees.

BRIEF DESCRIPTION OF THE DRAWINGS

The objects, spirits and advantages of the preferred embodiments of the present invention will be readily understood by the accompanying drawings and detailed descriptions, wherein:

FIG. 6B is a 3-D view of a newly-designed guiding slot according to another embodiment of the present invention;

DETAILED DESCRIPTION OF THE PREFERRED EMBODIMENT

The present invention can be exemplified by but not limited to the preferred embodiment as described hereinafter.

Figure 1:
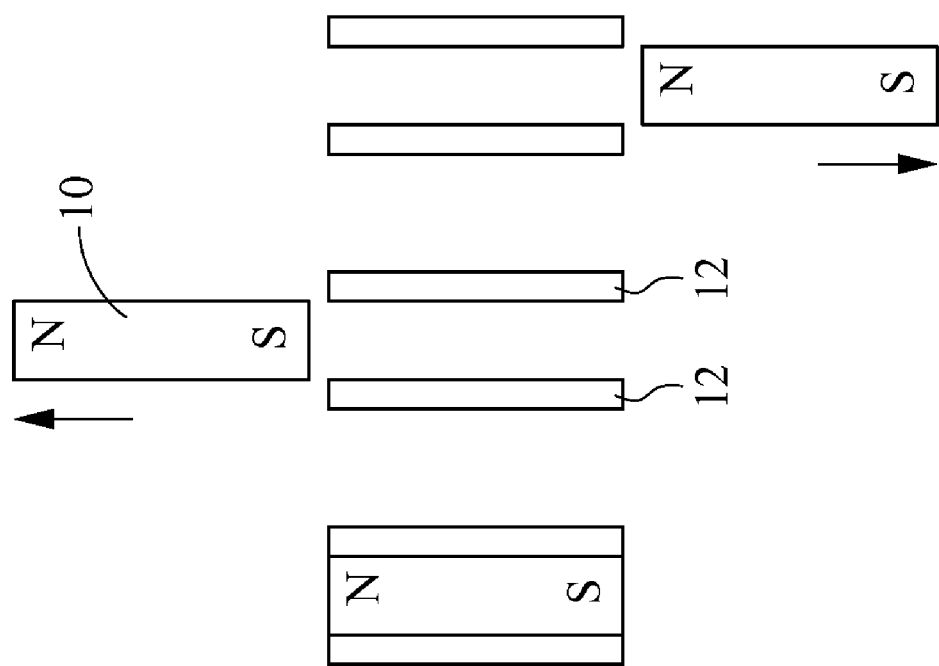
FIG. 1 is a schematic diagram showing an active cell magnet and stator winding of a conventional reciprocating compact power generator.
Figure 2A:
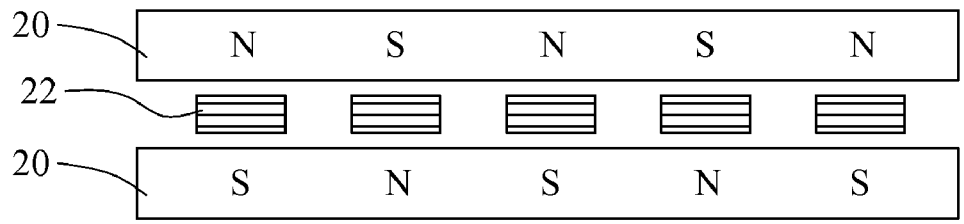
FIG. 2A is a side view showing a winding and a magnet of a conventional symmetric linear motor/power generator.
Figure 2B:
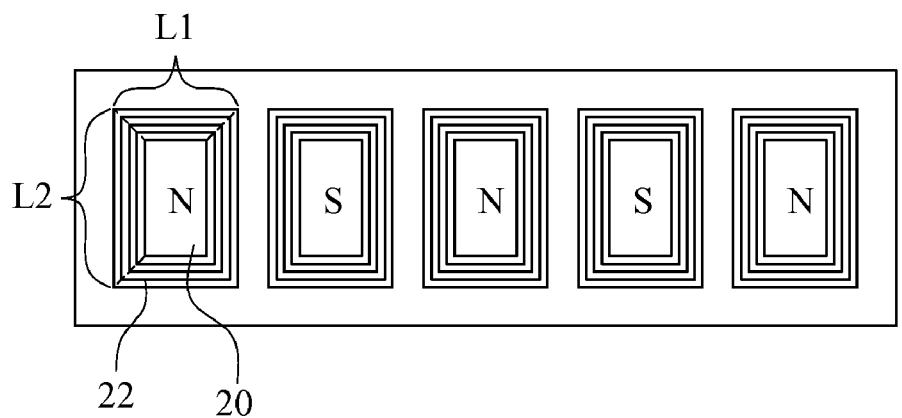
FIG. 2B is a top view showing a winding and a magnet of a conventional symmetric linear motor/power generator.
Figure 2C:
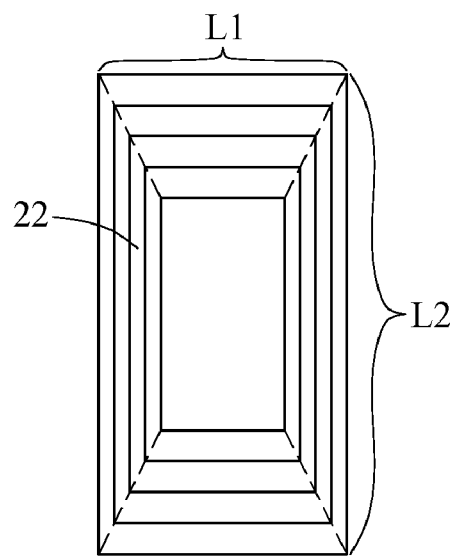
FIG. 2C is an enlarged view of a winding in FIG. 2B.
Figure 3A:
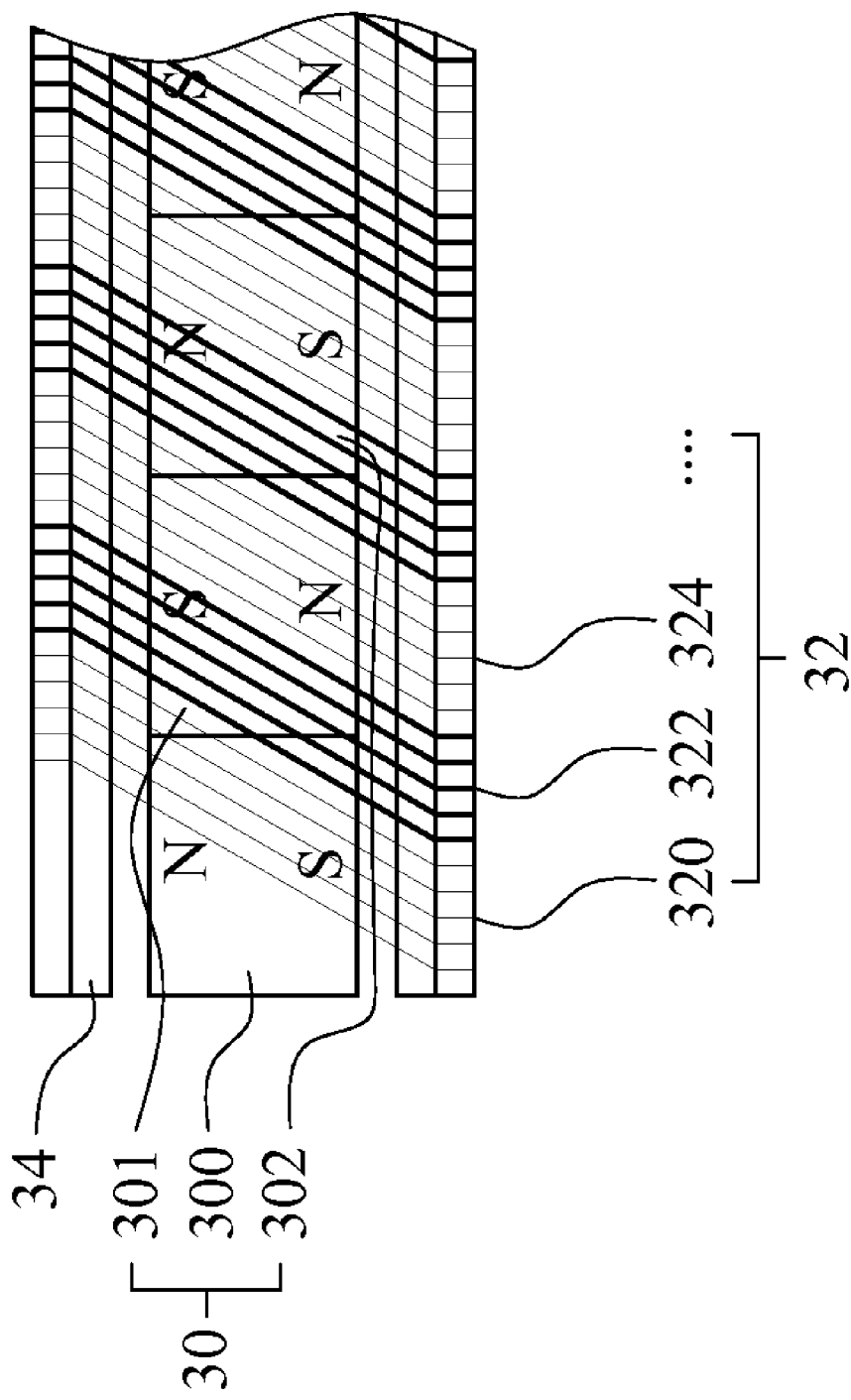
FIG. 3A is a cross-sectional view of a high power-density power generating module of the present invention.
Figure 3B:
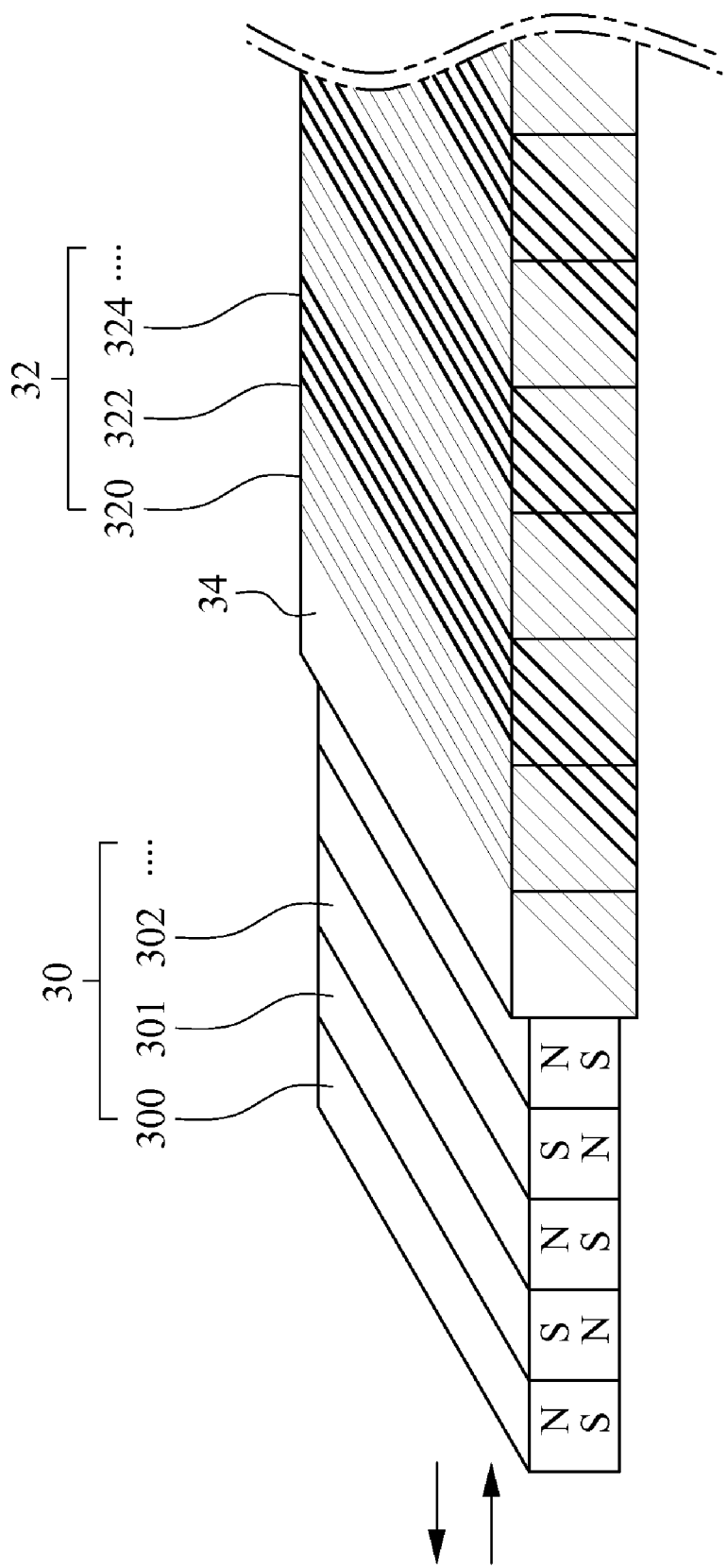
FIG. 3B is a 3-D view of a high power-density power generating module of the present invention.

Please refer to FIG. 3A and FIG. 3B showing a high power-density power generating module according to a first embodiment of the present invention, wherein FIG. 3A is a cross-sectional view and FIG. 3B is a 3-D view. The high power-density power generating module of the present invention comprises a magnet unit 30 and a winding unit 32. The magnet unit 30 comprises a plurality of adjacent magnets 300, 301, 302 with opposite magnet-pole arrangement against adjacent ones, each with a magnetic north pole and a magnetic south pole. The winding unit 32 has a plurality of adjacent windings with opposite winding directions around the adjacent magnets 320, 322, 324 around the magnet unit 30. More particularly, the winding directions of adjacent windings are opposite. If the winding unit 32 comprises more than two windings, the directions of the adjacent windings are alternate. Moreover, the winding unit 32 is wound around a guiding slot 34, which is cannularso as that the magnet unit 30 is capable of performing linear reciprocating movement.

As shown in FIG. 3A, the winding directions of the winding 320 and winding 322 are opposite and the winding directions of the winding 322 and winding 324 are also opposite. The rest may be deduced by analogy. The direction in which the magnetic poles of the magnet 300 are oriented is reverse from the direction in which the magnetic poles of the magnet 301 are oriented. The direction in which the magnetic poles of the magnet 301 are oriented is also reverse from the direction in which the magnetic poles of the magnet 302 are oriented. The rest may be deduced by analogy.

More particularly, in a first embodiment of the present invention, the windings are formed by slantedly winding wires. The winding directions of the windings in adjacent regions are reverse.

Therefore, as the magnet unit 30 is capable of moving relatively to the winding unit 32, the power generating module can achieve high power generation when the angle between the linking direction of the magnetic north pole and the magnetic south pole of each magnet 300, 301, 302 and the winding surface of each winding 320, 322, 324 is larger than 0 degree and smaller than 90 degrees.

Figure 4A:
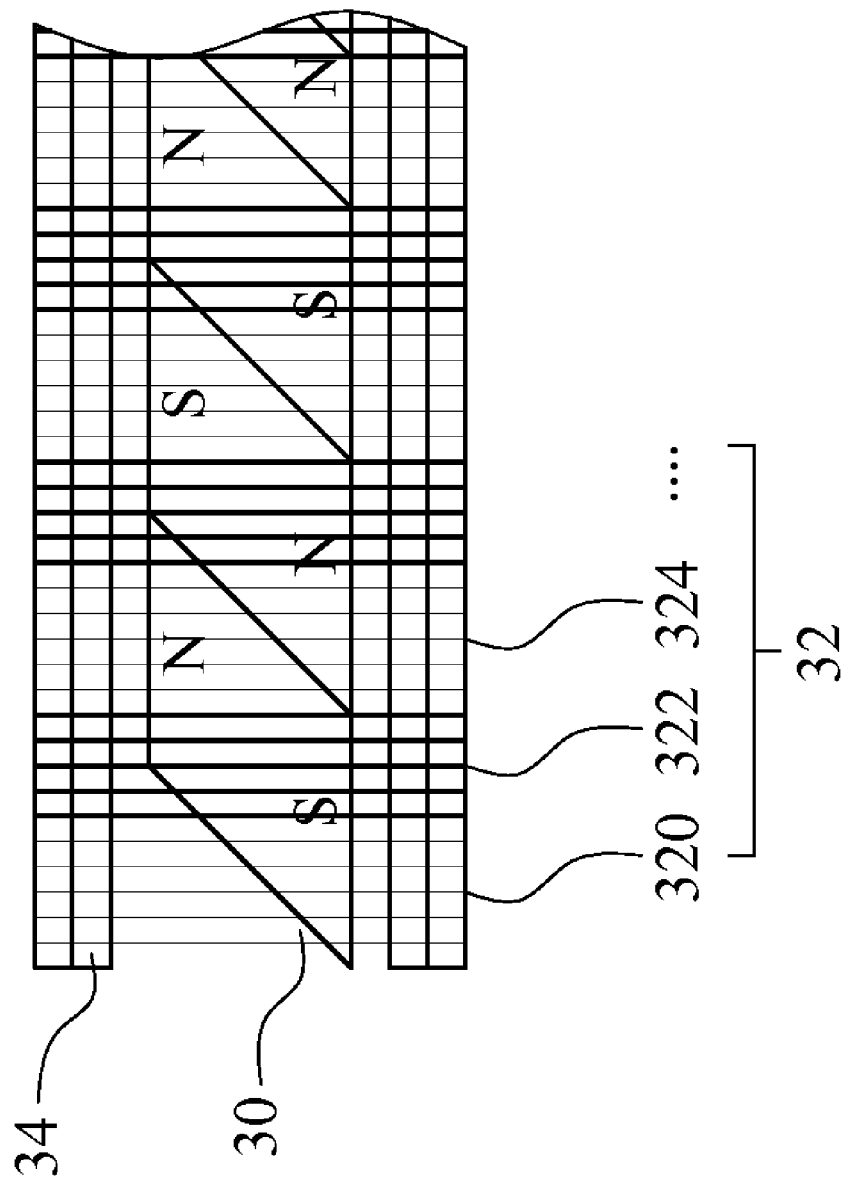
FIG. 4A is a cross-sectional view of a high power-density power generating module according to another embodiment of the present invention.
Figure 4B:
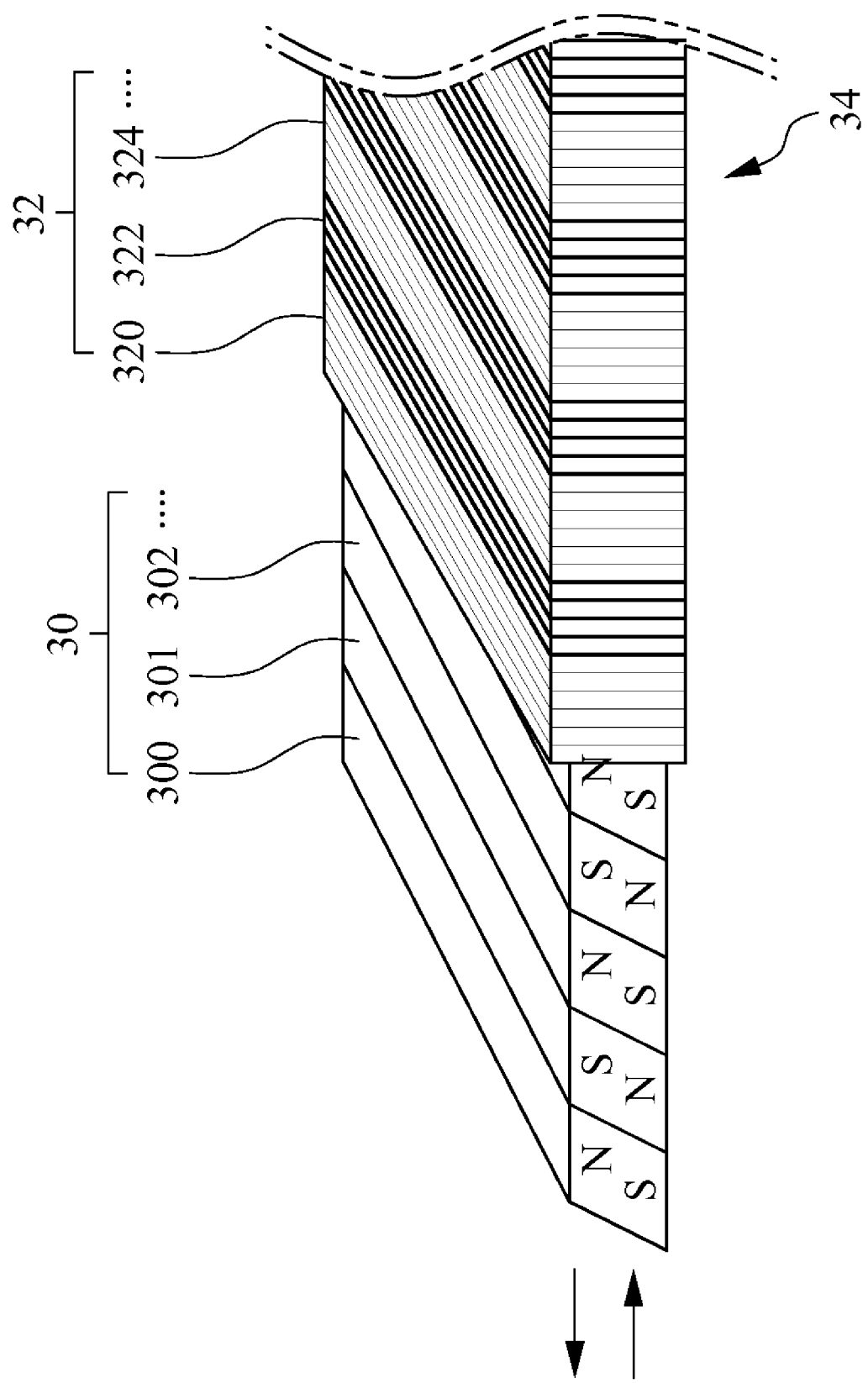
FIG. 4B is a 3-D view of a high power-density power generating module according to another embodiment of the present invention.

Please refer to FIG. 4A and FIG. 4B showing a high power-density power generating module according to another embodiment of the present invention, wherein FIG. 4A is a cross-sectional view and FIG. 4B is a 3-D view. In FIG. 4A and FIG. 4B, the notations are identical to those as used in the first embodiment, and thus are not repeated. The present embodiment is different from the first embodiment in that the windings in the present embodiment are wound vertically around a slant magnet unit 30. Therefore, as the magnet unit 30 is capable of moving relatively to the winding unit 32, the power generating module of the present embodiment can achieve high power generation when the angle between the linking direction of the magnetic north pole and the magnetic south pole of each magnet 300, 301, 302 and the winding surface of each winding 320, 322, 324 is larger than 0 degree and smaller than 90 degrees.

Figure 5:
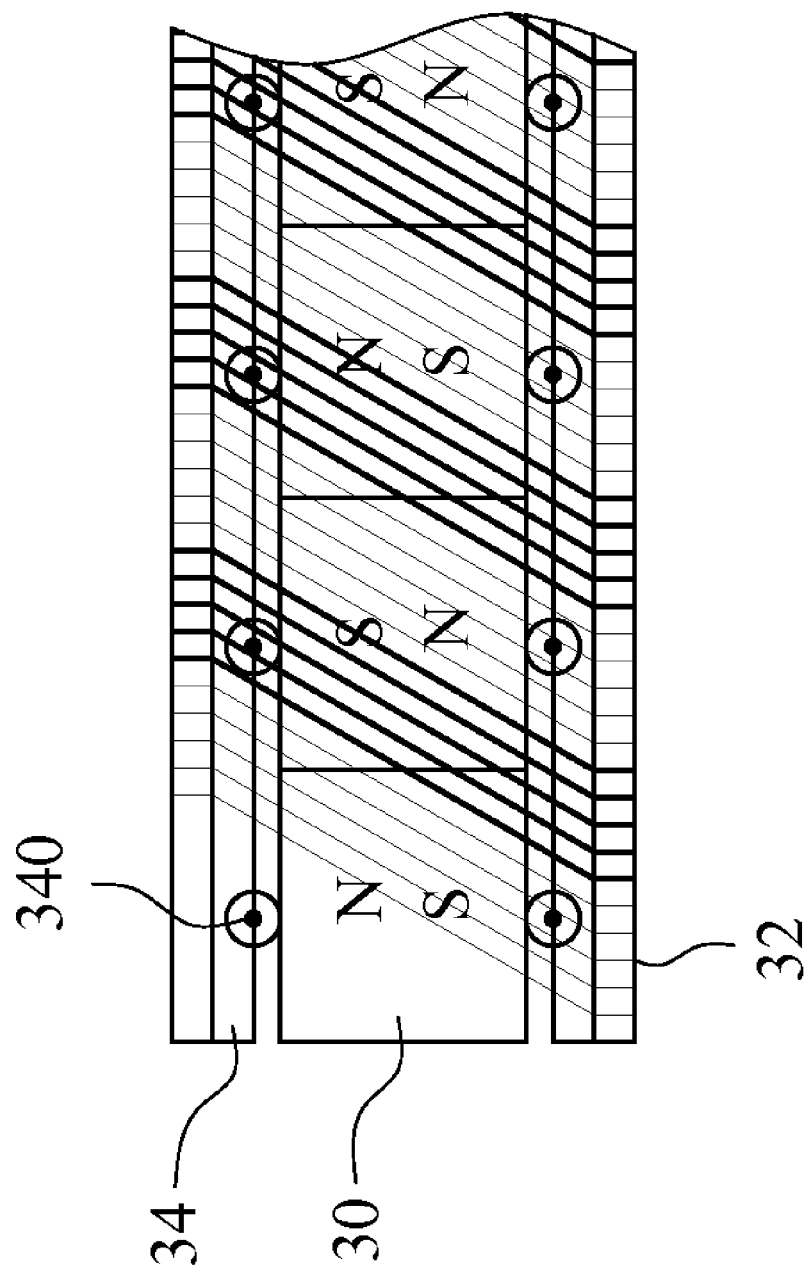
FIG. 5 is a cross-sectional view of a high power-density power generating module with a newly-designed guiding slot according to the present invention.

Referring to FIG. 5, the guiding slot 34 is provided with a plurality of rollers 340 (such as roller shafts or roller balls) on the inner wall. These rollers 340 are used to assist the magnet unit 30 to move relatively to the winding unit 34. Therefore, the kinetic frictional force between the power generator active cell and the moving guiding surface can be reduced so that the reciprocating power generator exhibits higher efficiency.

Figure 6A:
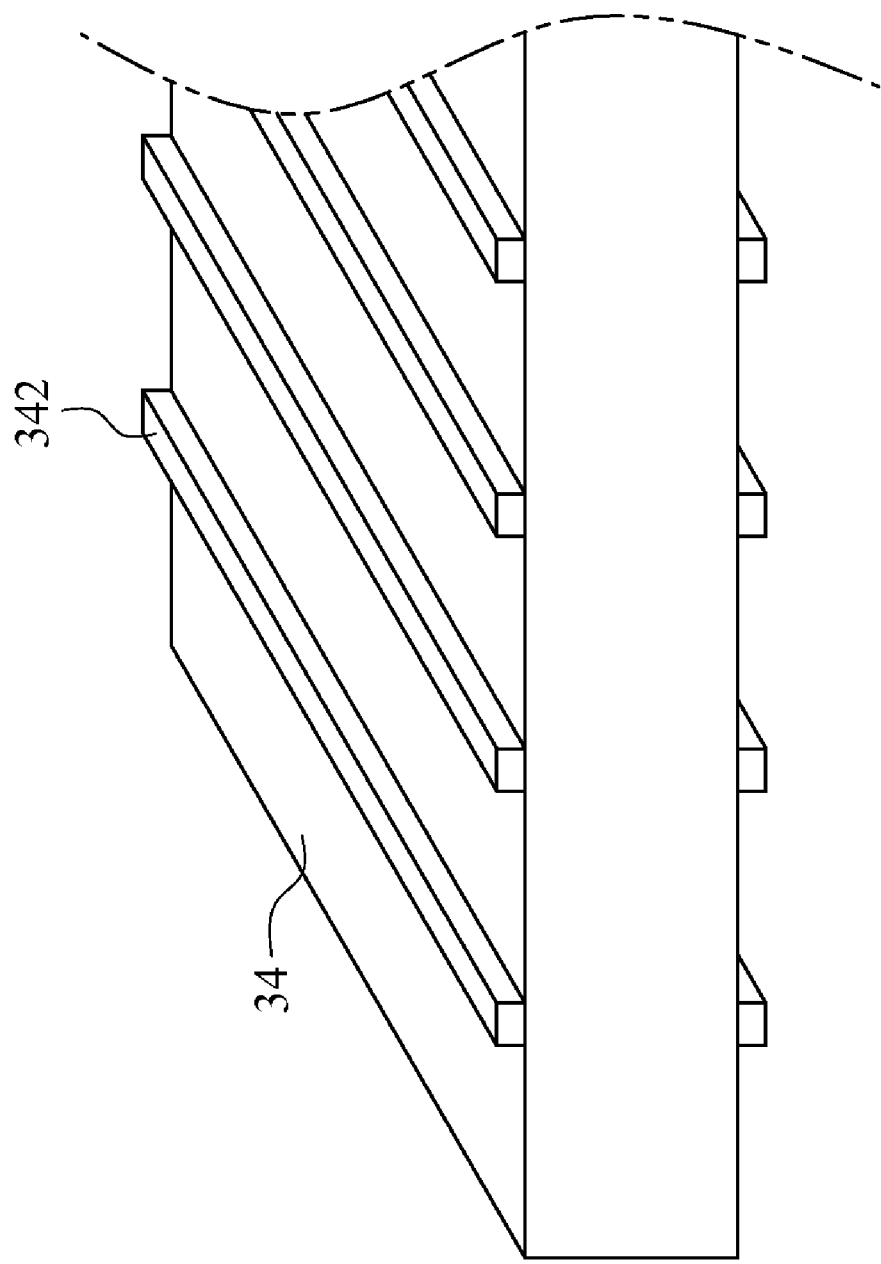
FIG. 6A is a 3-D view of a newly-designed guiding slot of the present invention.

In FIG. 6A, the guiding slot 34 is provided with a plurality of flanges 342 capable of separating each winding on the outer wall. Therefore, the windings are formed in order. Moreover, as shown in FIG. 6B, in the present embodiment, an extended flange 343 is provided between a flange 342a and a flange 342c adjacent to a flange 342b being opposite on the other side so that a groove 344 is formed between adjacent flanges 343. In the present invention, the magnet unit is formed by multi-pole magnetization on both sides. The number of magnetized magnetic poles on each surface is even. Moreover, the magnet unit can be also formed using two anisotropic magnets magnetized along a thickness direction to clip a ferromagnetic material. Moreover, the present invention is not limited to the rectangular cleavage of the magnet, as long as the magnet is capable of smoothly moving relatively to the guiding slot.

Figure 7A:
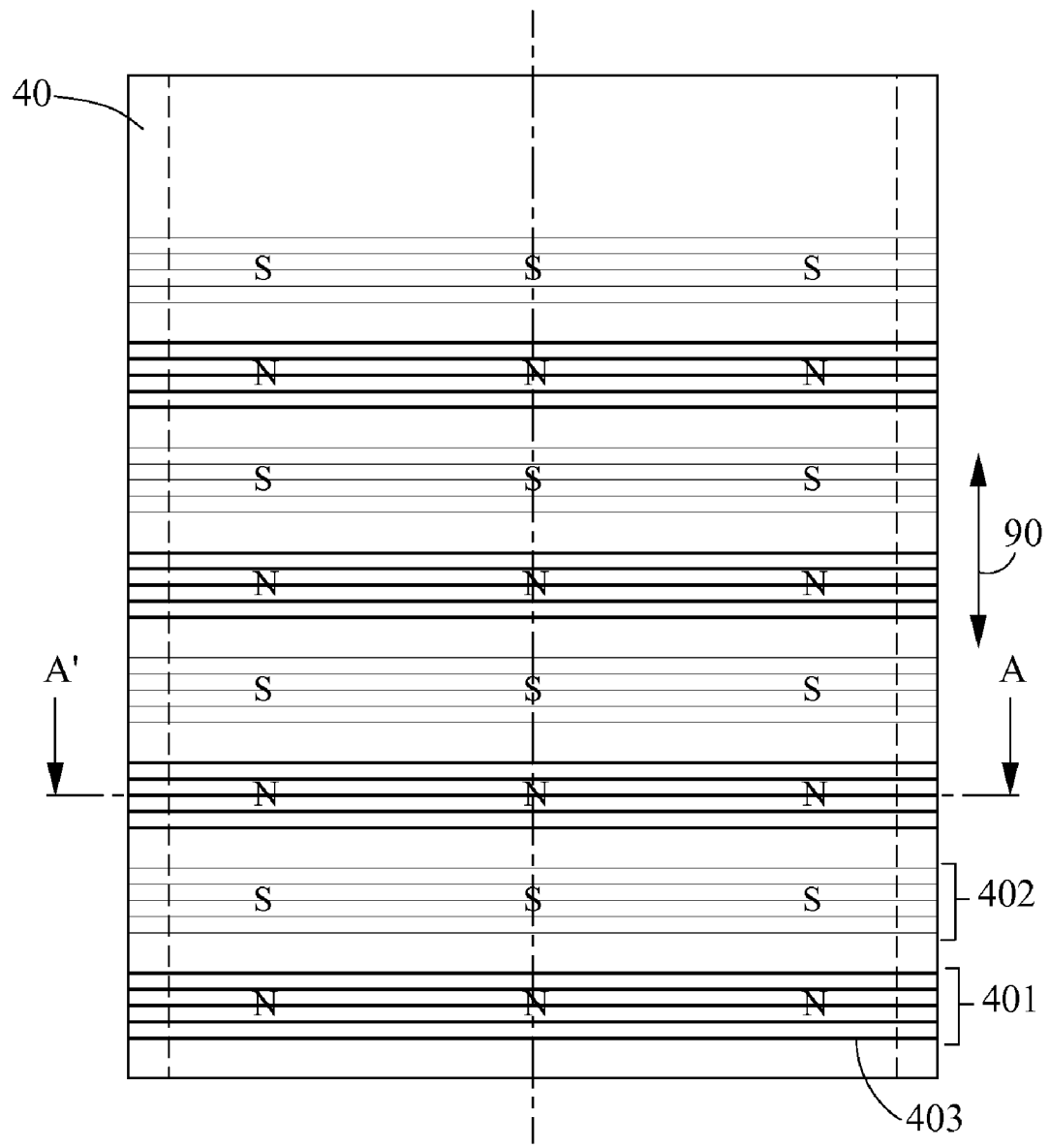
FIG. 7A is a top view of a magnet unit according to another embodiment of the present invention.
Figure 7B:
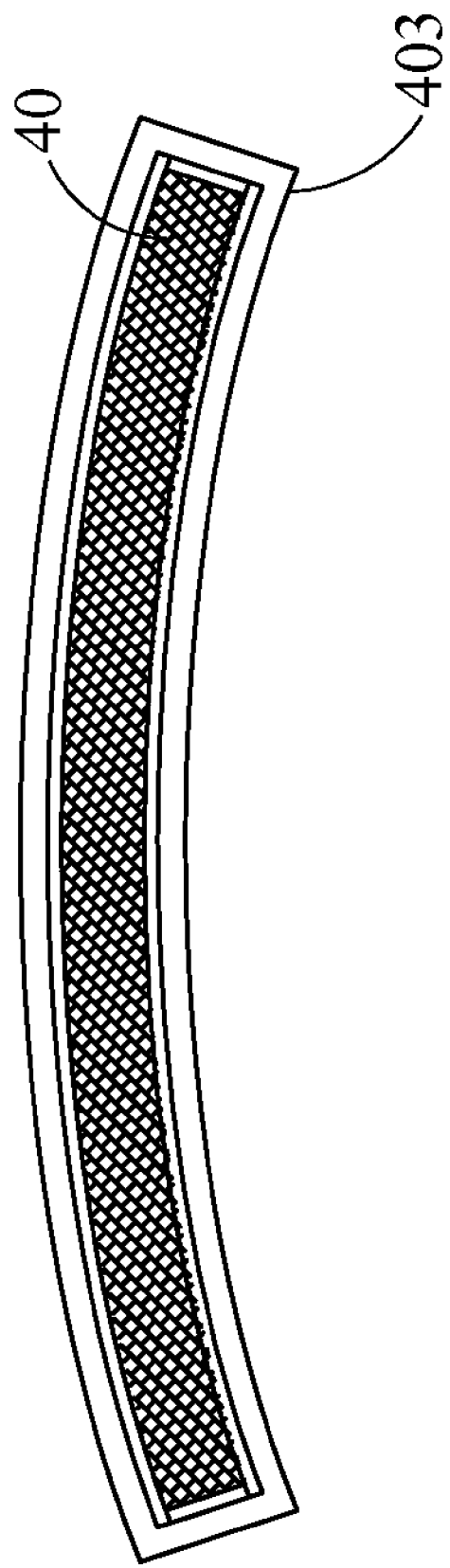
FIG. 7B is a cross-sectional view of a magnet unit in FIG. 7A.

For example, FIG. 7A and 7B show a magnet unit according to another embodiment of the present invention, wherein FIG. 7A is a top view and FIG. 7B is a cross-sectional view. In FIG. 7A, the magnet unit is provided with a plurality of N poles 401 and S poles 402. Each magnetic pole is wound by a winding 403. The arrow 90 indicates the moving direction of a stator relative to the active cell. In FIG. 7B, the magnet unit 40 of the present embodiment has a curved cleavage.

Figure 8A:
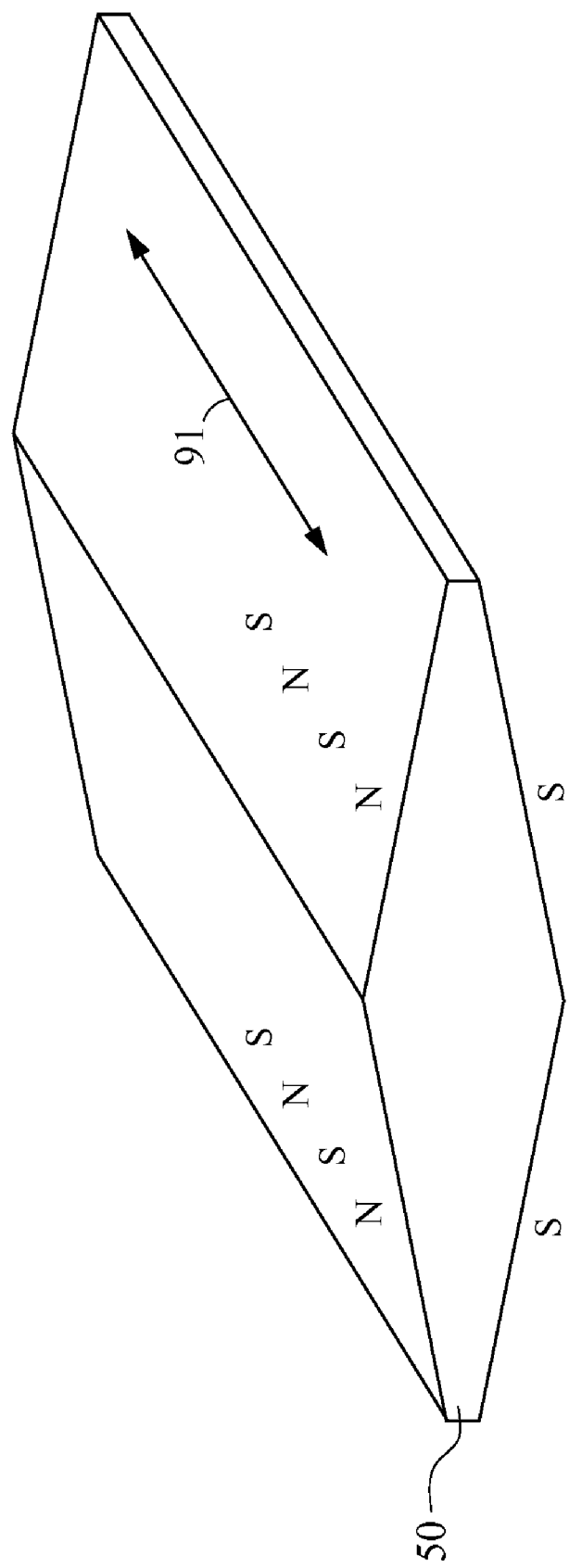
FIG. 8A and FIG. 8B are cross-sectional views of different magnet units.
Figure 8B:
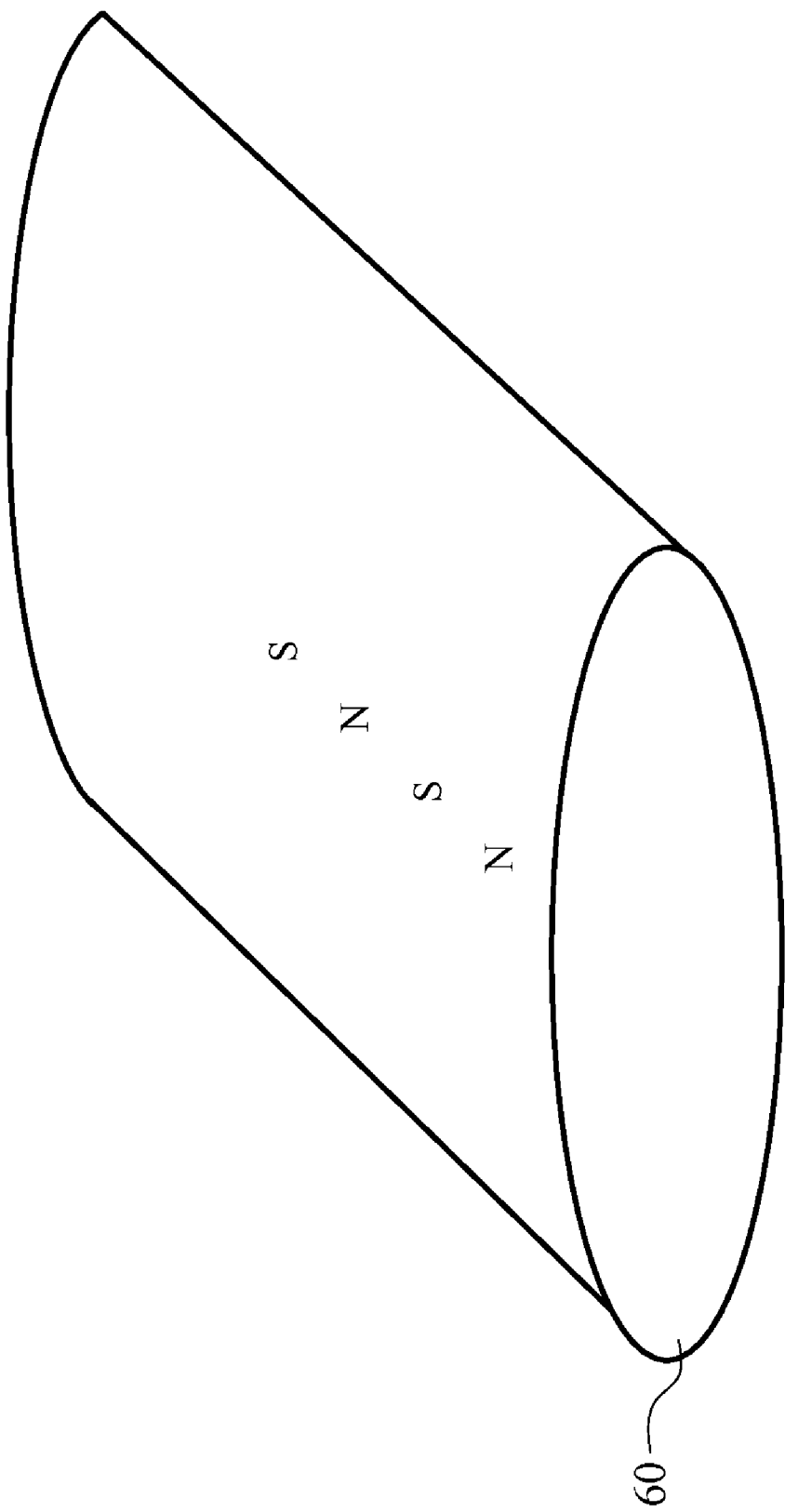

Moreover, in the embodiment shown in FIG. 8A, the magnet unit 50 is provided with alternate magnetic poles, and the magnet unit 50 has a polygonal cleavage. The arrow 91 indicates the moving direction of a stator relative to the active cell. Moreover, in FIG. 8B, the magnet unit 60 has an oval-shaped cleavage. The winding unit of the present invention is single-phased or multi-phased. The guiding slot is formed in one process or by combining plural materials. Moreover, the guiding slot is wound by the winding successively or the winding is inserted into the guiding slot after the winding has been formed according to the cleavage of the guiding slot.

Figure 9:
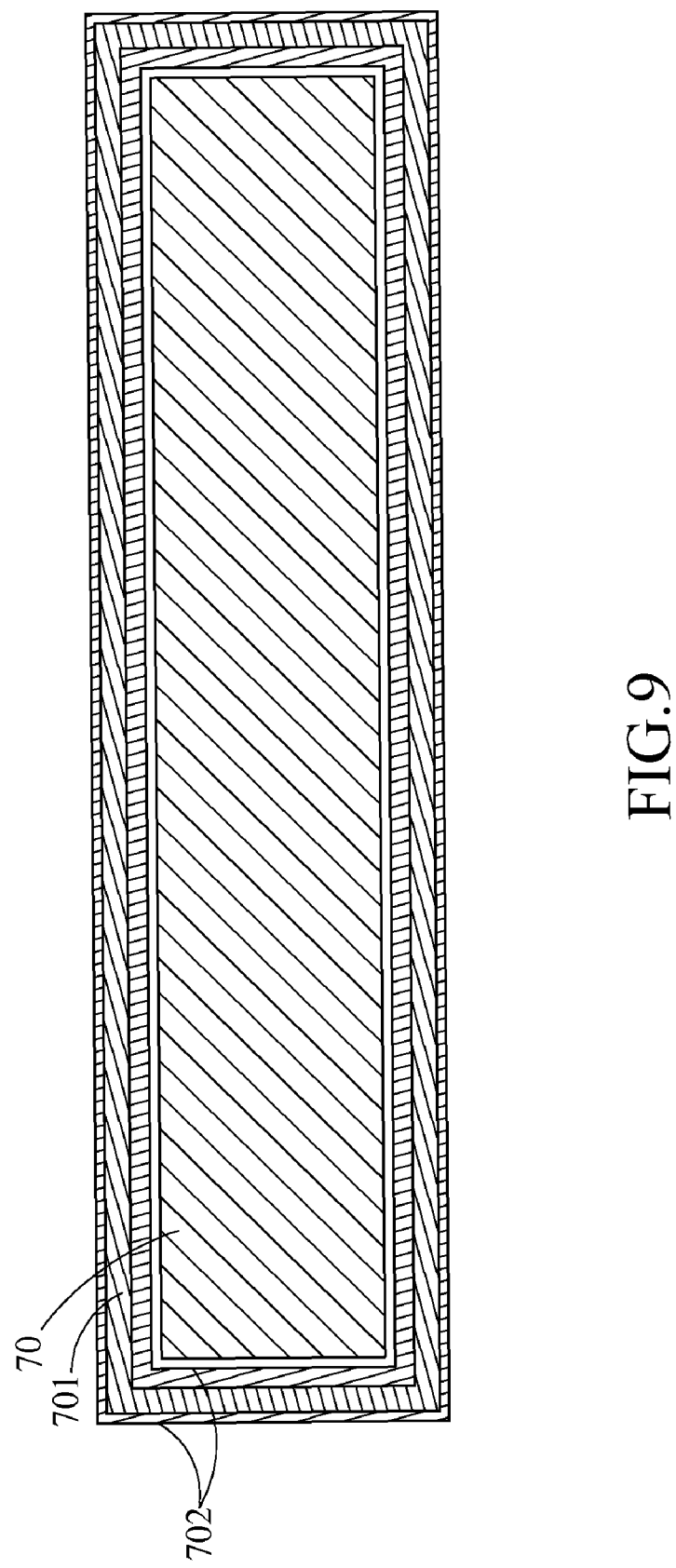
FIG. 9 is a cross-sectional view of a winding with a coating layer of the present invention.

As shown in FIG. 9, in the present embodiment, the winding 701 wound around the magnet unit 70 of the present invention can be shaped using irrigating tools to spread a coating layer 702 made of polymer with low fricition coefficient (such as adhesive or Teflon but not limited thereto) or other materials all over the inner surface of the winding so that the winding and the materials on the inner surface of the winding winding are combined as a guiding slot without using any independent guiding element.

Accordingly, the high power-density power generating module of the present invention exhibits advantages such as:

1. carelessness to reduce resistance and achieve energy recycling;
2. the active cell being wound by the winding so as to make the most of the magnetic flux;
3. larger number of turns within a range of effective magnetic flux density;
4. the effective length of the winding capable of generating induced electromotive force (EMF) being increased to reduce the internal resistance of the winding within a range of effective magnetic flux density;
5. the distance between the magnetic poles being shortened to achieve high-efficiency energy recycling;
6. capability of being combined with energy recycling mechanism such as spring oscillation system; and
7. capability of being thinned so as to integrate with various devices and carriers.

Therefore, the present invention provides a low speed or low frequency high power-density power generating module with high magnetic flux efficiency, in spite of high copper cost and power generator size imitation, to shorten the total wire length of the winding and increase the power density and power conversion rate. Therefore, the present invention is useful, novel and non-obviousness.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A high power-density power generating module, comprising:
   a magnet unit having a plurality of adjacent magnets with opposite magnet-pole arrangement against adjacent ones, each with a magnetic north pole and a magnetic south pole; and
   a winding unit having a plurality of adjacent windings with opposite winding directions around the magnet unit;
   wherein the magnet unit is capable of moving relatively to the winding unit and the angle between the linking direction of the magnetic north pole and the magnetic south pole of each magnet and the winding surface of each winding is larger than 0 degree and smaller than 90 degrees.

2. The high power-density power generating module as recited in claim 1, wherein the magnet unit is manufactured by multi-pole magnetization on both sides.

3. The high power-density power generating module as recited in claim 1, wherein the magnet unit comprises a ferromagnetic material sandwiched by two anisotropic magnets magnetized along a thickness direction.

4. The high power-density power generating module as recited in claim 1, wherein the winding unit is single-phased.

5. The high power-density power generating module as recited in claim 1, wherein the winding unit is multi-phased.

6. The high power-density power generating module as recited in claim 1, further comprising a guiding slot disposed between the winding unit and the magnet unit for guiding the magnet unit to move relatively to the winding unit.

7. The high power-density power generating module as recited in claim 6, wherein the guiding slot is formed by one piece.

8. The high power-density power generating module as recited in claim 6, wherein the guiding slot is formed by a plurality of pieces.

9. The high power-density power generating module as recited in claim 8, wherein the guiding slot is provided with a plurality of flanges for defining the windings.

10. The high power-density power generating module as recited in claim 1, further comprising a plurality of rollers between the winding unit and the magnet unit for aiding the magnet unit to move relatively to the winding unit.

11. The high power-density power generating module as recited in claim 1, wherein the angle between the linking direction of the magnetic north pole and the magnetic south pole of each magnet and the winding surface of each winding is 45 degrees.

12. The high power-density power generating module as recited in claim 1, wherein the winding of the winding unit is coated by a coating layer.

* * * * *